US008185669B2

(12) United States Patent
Oh

(10) Patent No.: US 8,185,669 B2
(45) Date of Patent: May 22, 2012

(54) SIGNAL OUTPUT DEVICE OF HDMI DEVICE AND METHOD THEREOF

(75) Inventor: Sung Bo Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 938 days.

(21) Appl. No.: 11/775,279

(22) Filed: Jul. 10, 2007

(65) Prior Publication Data

US 2008/0104660 A1 May 1, 2008

(30) Foreign Application Priority Data

Oct. 25, 2006 (KR) ........................ 10-2006-0104044

(51) Int. Cl.
*G06F 3/00* (2006.01)

(52) U.S. Cl. .......................................................... 710/8

(58) Field of Classification Search ....................... 710/8
See application file for complete search history.

(56) References Cited

U.S. PATENT DOCUMENTS

| | | | | |
|---|---|---|---|---|
| 7,079,128 | B2 * | 7/2006 | Kim | 345/213 |
| 7,184,000 | B2 * | 2/2007 | Itakura | 345/3.1 |
| 2006/0020794 | A1 | 1/2006 | Oh | |
| 2007/0075126 | A1 * | 4/2007 | Fu et al. | 235/375 |

FOREIGN PATENT DOCUMENTS

| | | |
|---|---|---|
| CN | 1375815 | 10/2002 |
| CN | 1725353 | 1/2006 |
| KR | 1020060095012 | 8/2006 |
| KR | 10-681098 | 2/2007 |

OTHER PUBLICATIONS

"High-Definition Multimedia Interface (HDMI) Specification Version 1.3", Jun. 22, 2006, pp. 1, 10-11, 47-49, and 55.*

Chinese Office Action issued Aug. 21, 2009 in CN Application No. 2007101307892.

* cited by examiner

*Primary Examiner* — Chun-Kuan Lee

(74) *Attorney, Agent, or Firm* — Stanzione & Kim, LLP

(57) ABSTRACT

A signal output device of an HDMI device and a method thereof, which can automatically determine a type of an HDMI cable such that a display device such as a television set can always display an optimal screen. The signal output method of a digital interface device to output a signal of a device connected to a digital interface cable includes determining the type of the digital interface cable, and comparing a resolution which can be supported by the digital interface cable with an output resolution of the device which is set and outputting whether the digital interface cable can support the output resolution.

18 Claims, 8 Drawing Sheets

Fig. 3

| Type A pin | Signal Name | Wire |
|---|---|---|
| 1 | TMDS Data2+ | A |
| 2 | TMDS Data2 Shield | B |
| 3 | TMDS Data2- | A |
| 4 | TMDS Data1+ | A |
| 5 | TMDS Data1 Shield | B |
| 6 | TMDS Data1- | A |
| 7 | TMDS Data0+ | A |
| 8 | TMDS Data0 Shield | B |
| 9 | TMDS Data0- | A |
| 10 | TMDS Clock+ | A |
| 11 | TMDS Clock Shield | B |
| 12 | TMDS Clock- | A |
| 13 | CEC | C |
| 14 | Reserved (in cable but N.C. on device) | C |
| 15 | SCL | C |
| 16 | SDA | C |
| 17 | DDC/CEC Ground | D |
| 18 | +5V Power | 5V |
| 19 | Hot Plug Detect | C |

SIGNAL OUTPUT DEVICE OF HDMI DEVICE AND METHOD THEREOF

CROSS-REFERENCE TO RELATED APPLICATIONS

This application claims the benefit of Korean Patent Application No. 2006-104044, filed on Oct. 25, 2006 in the Korean Intellectual Property Office, the disclosure of which is incorporated herein in its entirety by reference.

BACKGROUND OF THE INVENTION

1. Field of the Invention

The present general inventive concept relates to a signal output device of a high definition multimedia interface (HDMI) device and a method thereof to simultaneously transmit a digital audio and video signal, and more particularly, to a signal output device of an HDMI device and a method thereof, which can automatically determine the type of a HDMI cable to display an optimal screen on a display device such as a television set.

2. Description of the Related Art

Recently, digital versatile discs (hereinafter, referred to as DVDs) are widely used as a recording medium for recording/reproducing a high-definition video signal and a high-definition audio signal. In addition, a digital video display device (for example, a digital satellite broadcasting device) capable of displaying a high-definition video signal and a high-resolution digital television set capable of displaying a high-definition digital video signal of a DVD are widely used.

Accordingly, a variety of DVD apparatuses are connected to a digital TV set for recording/reproducing video signals on/from the DVDs (for example, DVD players, DVD recorders or the like) to a digital TV set. A digital visual interface (DVI) device or an HDMI device is used as a digital interface device for transmitting data between the devices.

The HDMI is a multimedia interface for transmitting an uncompressed full digital audio and video signal through a single cable, which provides an interface between a source device, such as an audio/video source, a set top box (hereinafter, referred to as a STB) or a DVD player, and a sync device such as a monitor or a digital TV set.

An apparatus for transmitting an audio and video signal to the sync device such as the digital TV set, using the digital interface device, such as the HDMI device, is referred to as a digital interface apparatus. The digital interface apparatus includes a set top box (STB), a VTR, and a game machine as well as a variety of DVD apparatuses.

Korean Laid-Open Patent Publication No. 2004-0081776 discloses an example of connecting a set top box, which is a source device, and a display device, which is a sync device, through an HDMI cable and transmitting video and audio data.

However, in a digital interface device, such as the HDMI device, disclosed in the above-described publication, a user cannot determine the type of the HDMI cable when the source device and the sync device are connected through the HDMI cable. Accordingly, when the HDMI cable cannot support a current output resolution, the display device, which is the sync device, cannot output a high-definition screen. Thus, the user cannot view the screen or the user can view a distorted screen with noise.

SUMMARY OF THE INVENTION

The present general inventive concept provides a signal output device of an HDMI device and a method thereof, which can automatically determine the type of an HDMI cable to connect a source device and a sync device and can inform a user of the type of the HDMI cable.

The present general inventive concept provides a signal output device of an HDMI device and a method thereof, which can output a message that an HDMI cable must be replaced or an output resolution must be set to a resolution which can be supported by the HDMI cable such that a display device, such as a digital TV set, can always display an optimal screen (desirable or optimized screen image) when the HDMI cable cannot support a current output resolution.

Additional aspects and utilities of the general inventive concept will be set forth in part in the description which follows and, in part, will be obvious from the description, or may be learned by practice of the general inventive concept.

The foregoing and/or other aspects and utilities of the present general inventive concept can be achieved by providing a signal output method of a digital interface device to output a signal of a device connected to a digital interface cable, the method including determining the type of the digital interface cable, and comparing a resolution which can be supported by the digital interface cable with an output resolution of the device which is set and outputting whether the digital interface cable can support the output resolution.

The digital interface cable may be a high definition multimedia cable (HDMI).

The determining of the type of the digital interface cable may include checking whether a reserved pin of the HDMI cable is connected to ground or +5V to determine the type of the HDMI cable.

The determining of the type of the HDMI cable may include connecting a resistor to a reserved pin of the digital interface cable to determine the type of the HDMI cable.

The reserved pin of the HDMI cable may be a pin 14.

The outputting of whether the digital interface cable can support the output resolution may include a message that the HDMI cable must be replaced when the HDMI cable cannot support the output resolution.

The outputting of whether the digital interface cable can support the output resolution may include outputting a message that the output resolution must be set to the resolution which can be supported by the HDMI cable when the HDMI cable cannot support the output resolution.

The method may further include selecting the resolution of the device outputted by user command, and the outputting of whether the digital interface cable can support the output resolution may include outputting an alert message that a resolution which cannot be supported by the HDMI cable is selected, when a user selects the resolution which cannot be supported by the HDMI cable.

The foregoing and/or other aspects and utilities of the present general inventive concept may also be achieved by providing a signal output method of a digital interface device to output a signal of a device connected to a digital interface cable, the method including determining the type of the digital interface cable and comparing the type of the digital interface cable with the output resolution of the device which is set and outputting whether the type of the digital interface cable can support the output resolution.

The foregoing and/or other aspects and utilities of the present general inventive concept may also be achieved by providing a signal output device of a digital interface device to output a signal of a device connected to a digital interface cable, the device including a controller which determines the type of the digital interface cable and outputs whether the type of the digital interface cable can support an output resolution which is set.

The controller may output a message that the digital interface cable must be replaced when the digital interface cable cannot support the output resolution.

The controller may output a message that the output resolution is set to a resolution which can be supported by the digital interface cable when the digital interface cable cannot support the output resolution.

The controller may output an alert message that a resolution which cannot be supported by the digital interface cable is selected when a user selects the resolution that cannot be supported by the digital interface cable.

The foregoing and/or other aspects and utilities of the present general inventive concept may also be achieved by providing signal output device of a digital interface device, including a transmission unit connectable to an external digital interface cable to receive information on a type of the external digital interface, and a controller to generate a signal corresponding to the type of the external digital interface.

The controller may generate the signal according to a communication state between the transmission unit and the external digital interface device.

The transmission unit may receive EDID from an external display device connectable through the digital interface cable, and the controller may generate the signal according to the received EDID signal.

The device may further include a decoder to generate data signal to be displayed on the external display device, and the controller may control the decoder to generate the data signal having a resolution according to the EDID and the type of the digital interface cable.

The device may further include a decoder to decode a data stream to generate video data, and the controller may control the decoder to generate the video date to have a resolution according to the type of the digital interface cable.

The information may include a connection state between pins of the digital interface device.

The signal may include at least one of a message to represent the type of the digital interface cable and a signal to represent a difference between a predetermined resolution and a resolution corresponding to the type of the digital interface cable.

BRIEF DESCRIPTION OF THE DRAWINGS

These and/or other aspects and utilities of the general inventive concept will become apparent and more readily appreciated from the following description of the embodiments, taken in conjunction with the accompanying drawings of which:

FIG. 3 is a structural diagram of a connector of an HDMI cable of the HDMI device of FIGS. 1 and 2 according to an embodiment of the present general inventive concept;

DETAILED DESCRIPTION OF THE PREFERRED EMBODIMENTS

Figure 1:
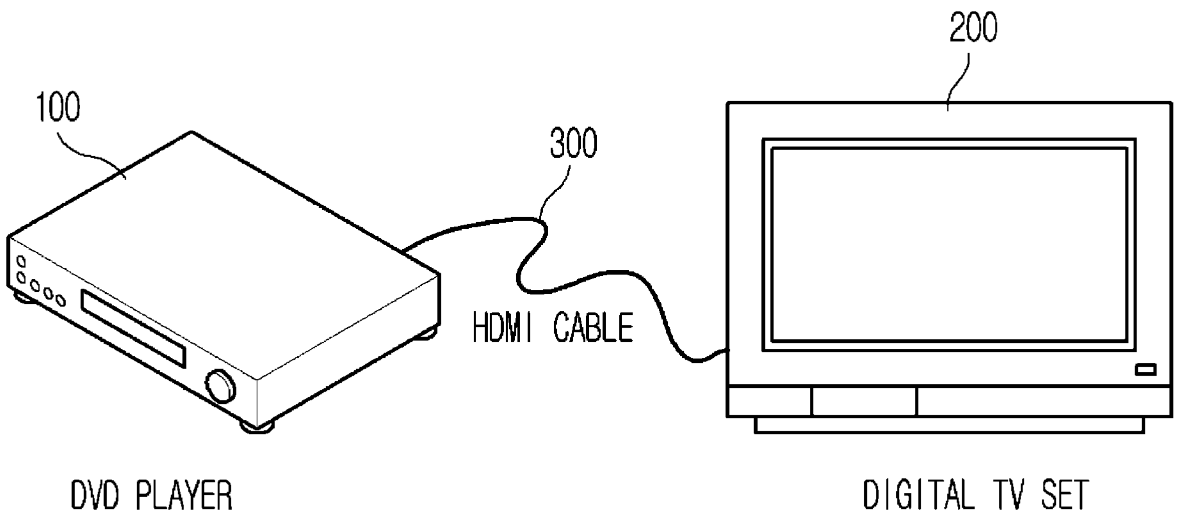
FIG. 1 is a diagram showing a system having a source device and a sync device connected through an HDMI cable according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

FIG. 1 is a diagram showing a system, such as an HEMI device, having a source device and a sync device connected to each other through an HDMI cable according to an embodiment of the present general inventive concept. A DVD player 100 which is the source device and a digital TV set 200 which is the sync device are connected through the HDMI cable 300 such that audio and video signals are transmitted from the DVD player 100 to the digital TV set 200 through the HDMI cable.

Figure 2:
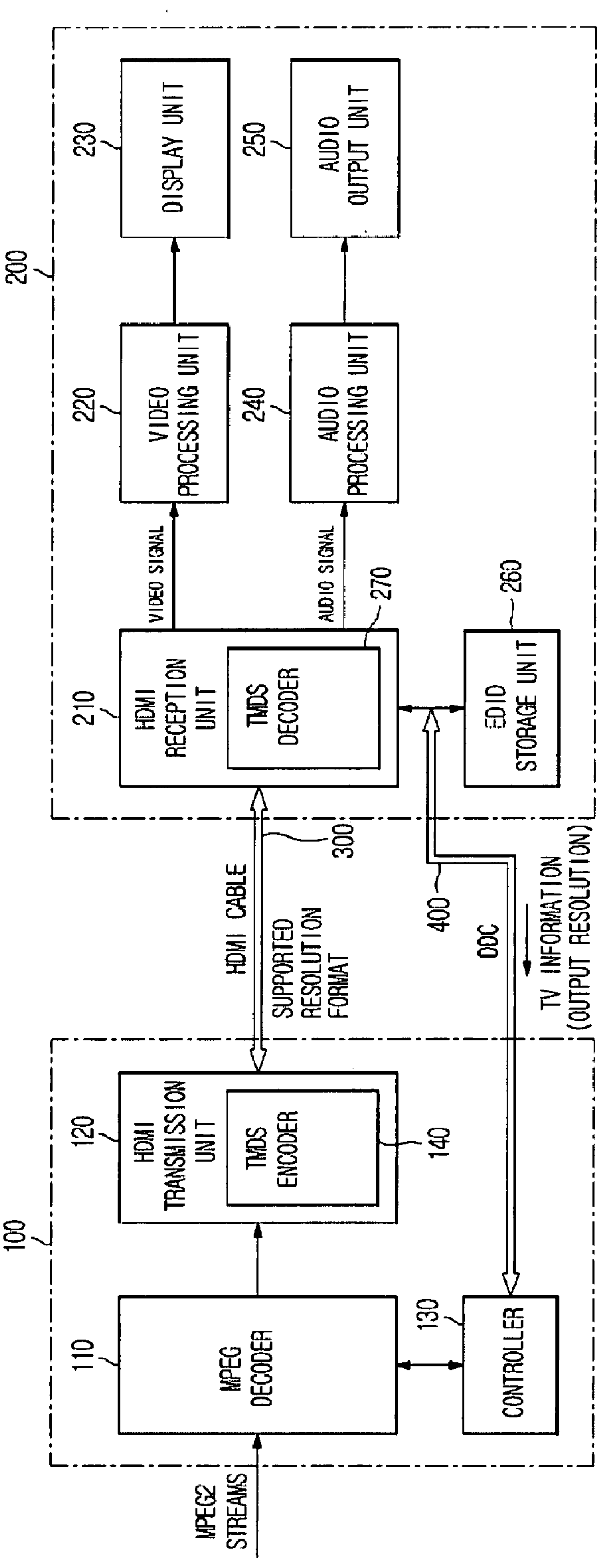
FIG. 2 is a block diagram showing a signal output device of the HDMI device of FIG. 1 according to an embodiment of the present general inventive concept.

FIG. 2 is a block diagram showing a signal output device of the HDMI device of FIG. 1 according to an embodiment of the present general inventive concept.

In FIG. 2, the DVD player 100 includes an MPEG decoder 110, an HDMI transmission unit 120, and a controller 130.

The MPEG decoder 110 receives MPEG-2 streams transmitted from a disc (for example, DVD) or a set top box (STB), performs decompression on the received MPEG-2 streams, and decodes the decompressed streams to generate digital video and audio data.

The HDMI transmission unit 120 converts the digital video and audio data decoded by the MPEG decoder 110 into a signal suitable for the HDMI device and transmits the converted signal to an external device, such as the sync device. The HDMI transmission unit 120 includes a transition minimized differential signaling interface (TMDS) encoder 140 to TMDS-encode the data decoded by the MPEG decoder 110 into a signal (or HDMI signal) having a format which can be transmitted to the digital TV set 200 through the HDMI device 300.

The controller 130 is a central processing unit (CPU) to read a data format to identify the digital TV set 200, that is, extended display identification data (EDID), through a display data channel (DDC) line 400 when the HDMI cable 300 is connected. The controller 130 checks a signal state of a hot plug and a communication state of the DDC line 400 to detect whether the HDMI cable 300 is connected to the digital TV set 200, and controls an output port to automatically be set to the HDMI device when it is detected that the HDMI cable 300 is connected.

Here, the hot plug represents that the HDMI cable 300 can be plugged and unplugged to and from a component, such as components of the source or sync device the HDMI device, without rebooting. The communication state represents that devices of the system is electrically connected, that is, ready to communicate with each other.

The HDMI cable 300 and the DDC line 400 may be separate cable lines. However, the HDMI cable 300 and the DDC line 400 may be formed in a single body structure in which the HDMI cable 300 and the DDC line 400 are simultaneously connected to the source and sync devices of the HDMI device such that data can be exchanged between the source and sync devices through the HDMI cable 300 and DDC line 400. The HDMI cable 300 may include the DDC line 400 as a portion of lines and pins thereof.

The digital TV set 200 connected to the DVD player 100 includes an HDMI reception unit 210 corresponding to the HDMI transmission unit 120, a video processing unit 220, a display unit 230, an audio processing unit 240, an audio output unit 250, and an EDID storage unit 260.

The HDMI reception unit 210 receives the digital video and audio signal transmitted from the HDMI transmission unit 120 of the DVD player 100. The HDMI reception unit 210 includes a TMDS decoder 270 for TDMS-decoding the HDMI signal having the format which can be transmitted through the HDMI device.

The video processing unit 220 processes the digital video signal transmitted from the HDMI reception unit 210 and outputs the processed video signal to the display unit 230 and the audio processing unit 240 processes the digital audio signal transmitted from the HDMI reception unit 210 and outputs the processed audio signal to the audio output unit 250.

The EDID storage unit 260 is an EEPROM to store the EDID. The data format defined in video electronics standards association (VESA), that is, the EDID, indicates display characteristic information data, which includes information such as a manufacturer or a standard, or basic display variables such as a supportable resolution and color format and characteristic information. The EDID data is stored in the EEPROM when the digital TV set 200 is manufactured.

Hereinafter, the operation and effect of the signal output device of the HDMI device having the above-described configuration and a method thereof will be described.

As HDMI spec 1.3 is published on Jun. 22, 2006, a new technology is added to the HDMI device and a new format is standardized. Thus, a significant variation is caused in the HDMI cable 300. The existing HDMI cable 300 cannot support a resolution of 1080 or more, but this version is standardized to be classified into a high-resolution HDMI cable to support a resolution of 1080 or more and a low-resolution HDMI cable 300 to support a resolution of less than 1080.

The HDMI cable 300 is classified into a low-resolution category 1 to support a resolution clock of 74.25 MHz or less and a high-resolution category 2 to support a resolution clock of greater than 74.25 MHz such that a user selects one of the categories 1 and 2 according to the resolution of the digital interface apparatus.

However, it is not yet defined how the HDMI cable 300 is checked and thus the user cannot check the resolution of the HDMI cable 300. Accordingly, when the user transmits high-resolution data using the low-resolution HDMI cable 300, a high-resolution screen may not be normally outputted or screen noise may occur due to the HDMI cable 300.

When the HDMI cable 300 connected to the digital TV set 200 cannot support a current output resolution, the user can easily replace the HDMI cable 300 with a new or another HDMI cable which can support the current output resolution by displaying a message that a high-resolution screen may not be normally displayed or an alert message that the HDMI cable 300 must be replaced.

Accordingly, in the present embodiment, when the DVD player 100, which is the source device, and the digital TV set 200, which is the sync device, are connected through the HDMI cable 300, it is possible to automatically determine the type of the HDMI cable 300 and to inform the user of the type of the HDMI cable 300.

Hereinafter, an example of automatically determining the type of the HDMI cable 300 according to the present embodiment will be described.

Figure 4:
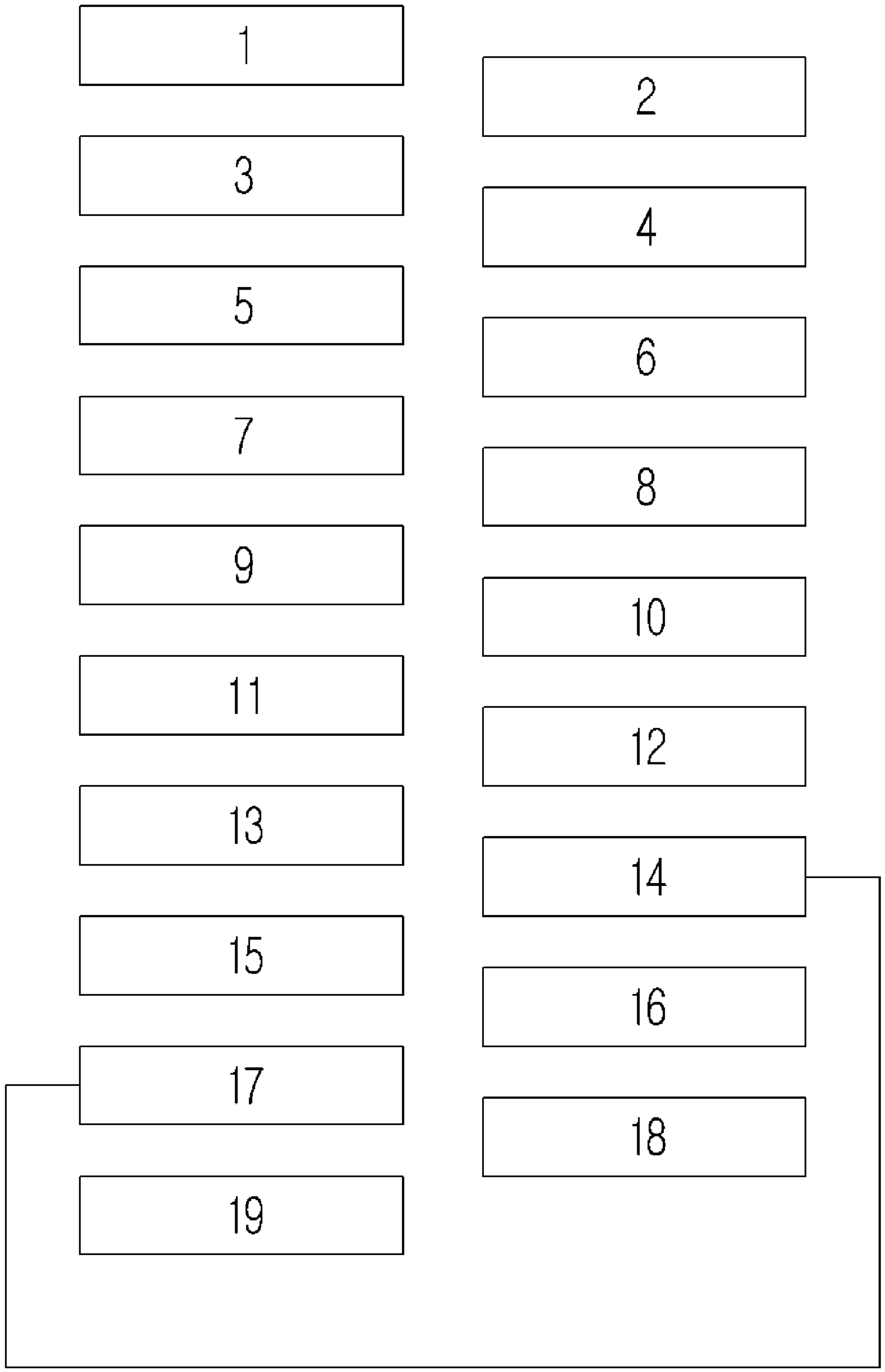
FIG. 4 is a diagram showing pin connection of a low-resolution category 1 of the HDMI cable of FIGS. 1 through 3.
Figure 5:
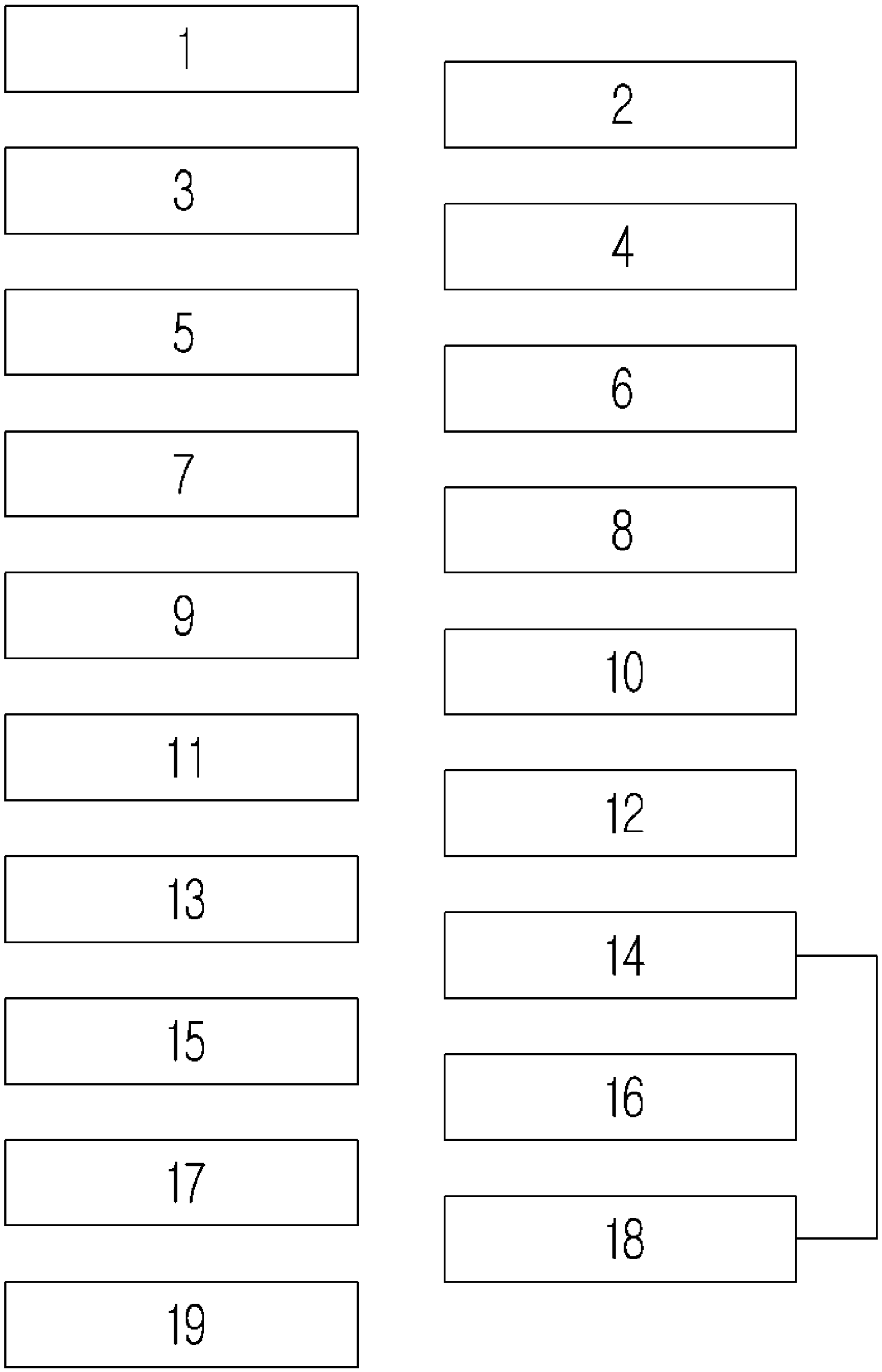
FIG. 5 is a diagram showing pin connection of a high-resolution category 2 of the HDMI cable of FIGS. 1 through 3.
Figure 6:
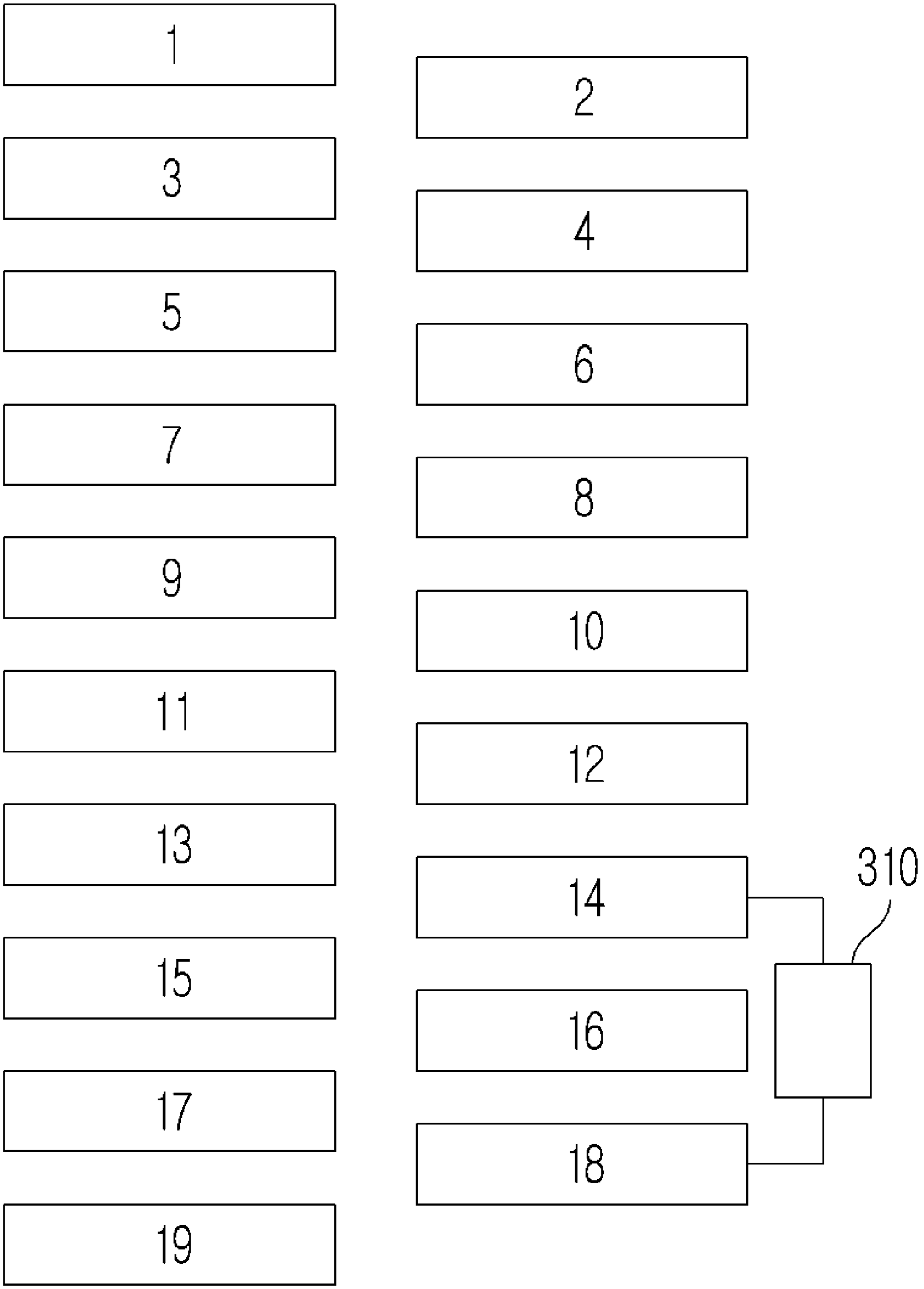
FIG. 6 is a diagram showing a connection of a pull-up resistor to check the low-resolution category 1 of the HDMI cable of FIGS. 3 and 4.
Figure 7:
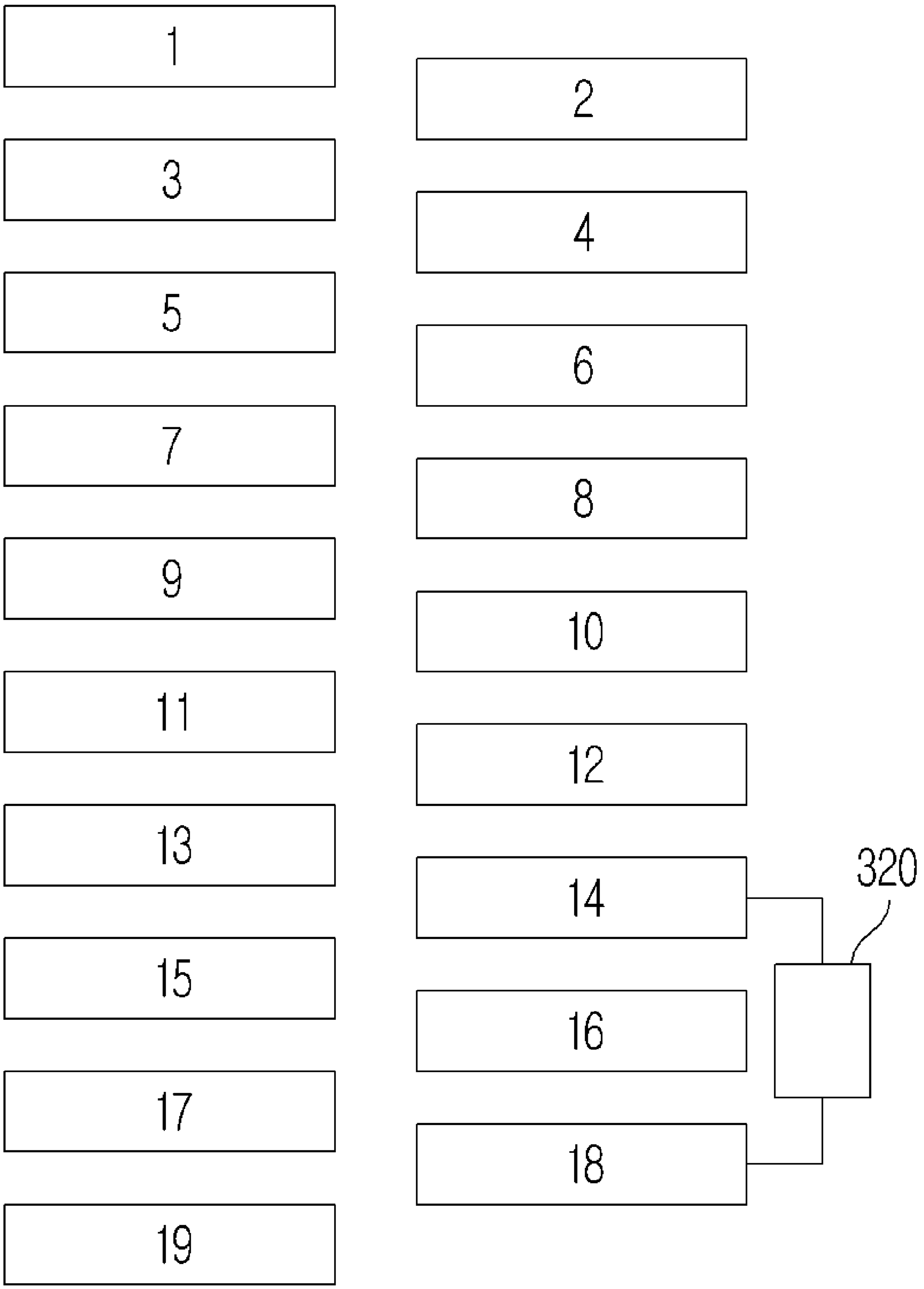
FIG. 7 is a diagram showing a connection of a pull-up resistor to check the high-resolution category 2 of the HDMI cable of FIGS. 3 and 5.

FIG. 3 is a structural diagram of a connector of the HDMI cable of FIGS. 1 and 2 according to an embodiment of the present general inventive concept, FIG. 4 is a diagram showing a pin connection of the low-resolution category 1 of the HDMI cable 300, FIG. 5 is a diagram showing a pin connection of the high-resolution category 2 of the HDMI cable 300, FIG. 6 is a diagram showing a connection of a pull-up resistor to check the low-resolution category 1 of the HDMI cable 300, and FIG. 7 is a diagram showing a connection of a pull-up resistor to check the high-resolution category 2 of the HDMI cable 300.

In FIG. 3, the HDMI cable 300 which is currently used in the present embodiment has 19 pins on which respective functions are written. The respective functions are represented as signal names assigned to pin numbers and wire types.

A reserved pin 14 of the HDMI cable 300 is used such that a method of checking the category of the HDMI cable 300 can be easily implemented with low cost.

The pin 14 is not currently used. Accordingly, when the pin 14 is connected to a pin 17 connected to ground, the low-resolution category 1 shown in FIG. 4 is defined and, when the pin 14 is connected to of a pin 18 connected to +5V, the high-resolution category 2 shown in FIG. 5 is defined. Thus, when the cable manufacturer produces and sells the HDMI cable 300, the manufacturer can inform the user of the type (category) of the HDMI cable 300 depending on the connection between the pin 14 and pins 17 and 18, for example, whether the pin 14 is connected to the pin 17 connected to ground or the pin 18 connected to +5V.

Alternatively, as shown in FIGS. 6 and 7, the pin 14 may be connected to the pin 18 connected to +5V through a first pull-up resistor 310 or the pin 14 may be connected to the pin 18 connected to +5V through a second pull-up resistor 320 to detect the voltage of the pin 14 such that the type (category) of the HDMI cable 300 can be checked by the voltage level of the pin 14.

The type of the HDMI cable 300 determined by the above-described method is compared with the output resolution which is currently set. When it is determined that the HDMI cable 300 cannot support the output resolution which is currently set a message that the HDMI cable 300 must be replaced or the output resolution must be set to a resolution which can be supported by the HDMI cable 300 is displayed. The detailed description thereof will be described with reference to FIG. 8.

Figure 8:
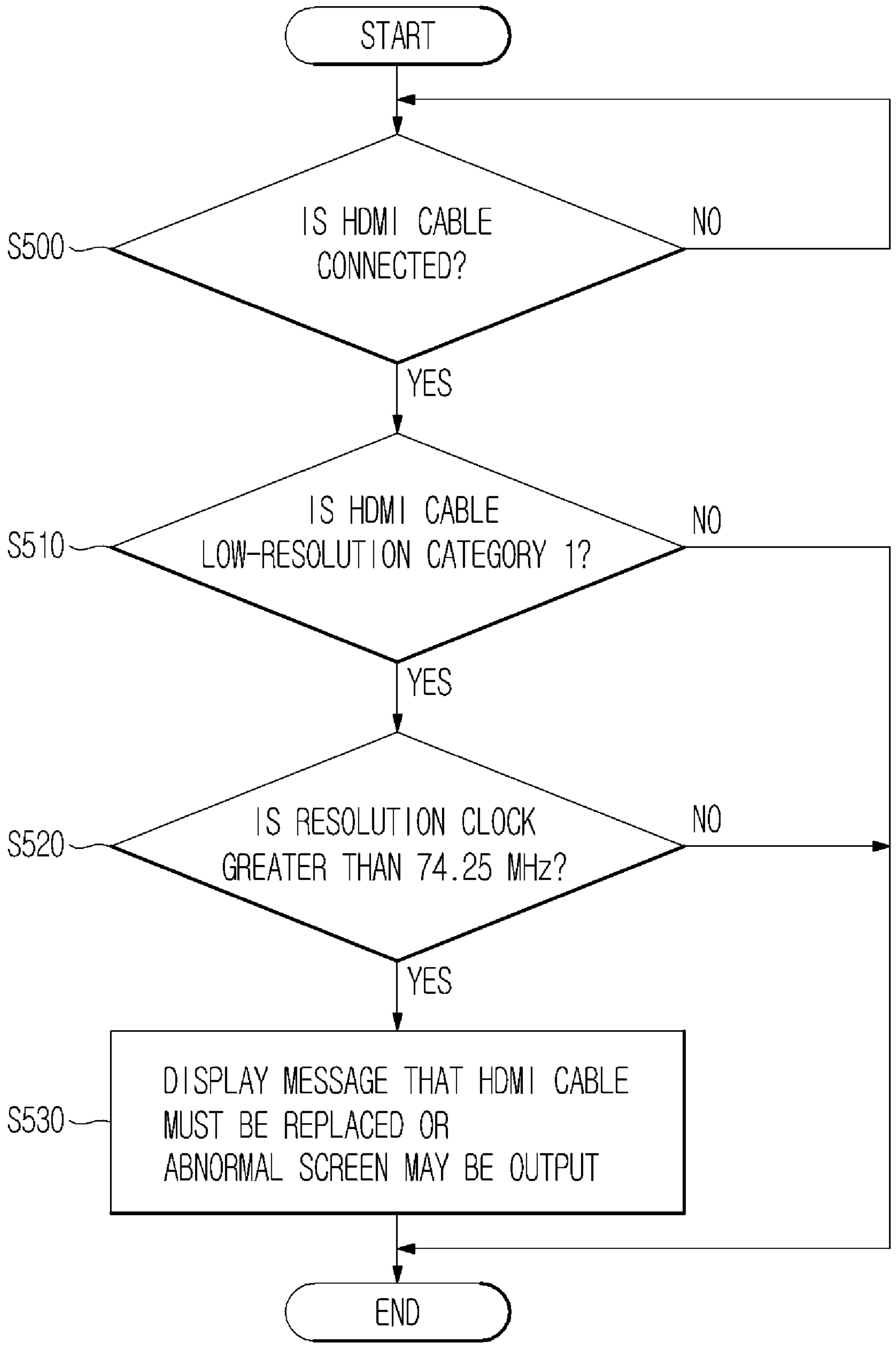
FIG. 8 is a flowchart illustrating a signal output method of an HDMI device according to an embodiment of the present general inventive concept.

FIG. 8 is a flowchart illustrating a signal output method of an HDMI device according to an embodiment of the present general inventive concept.

Referring to FIGS. 2-8, when the DVD player 100 and the digital TV set 200 are turned on, it is determined whether the DVD player 100 and the digital TV set 200 are connected through the HDMI cable 300 (S500).

In order to determine whether the DVD player 100 and the digital TV set 200 are connected through the HDMI cable 300, the controller 130 of the DVD player 100 determines whether a hot plug signal defined in the HDMI device, for example, a signal of the pin 19, is high.

When the DVD player 100 and the digital TV set 200 are connected through the HDMI cable 300, the hot plug signal is high (5V) and, when the DVD player 100 and the digital TV set 200 are not connected through the HDMI cable 300, the hot plug signal is low (0V).

When the hot plug signal is high, the controller 130 determines whether EDID communication for acquiring the EDID of the digital TV set 200 stored in the EDID storage unit 260 is performed through the DDC line 400 when the HDMI cable 300 is connected.

This operation is to allow the HDMI device to check whether the DVD player 100 and the digital TV set 200 transmits/receives information to/from each other through the DDC line 400.

The controller 130 checks the signal state (high) of the high plug and the communication state of the DDC line 400 to determine whether the HDMI cable 300 is connected to the digital TV set 200.

As the determined result, when the hot plug signal is high or the EDID communication is performed, the controller 130 determines that the HDMI cable 300 is connected.

When the HDMI cable 300 is connected, it is determined whether the HDMI cable 300 is the low-resolution category 1 (S510).

This operation is performed by determining the type of the HDMI cable 300 by the method described in FIGS. 3 to 7.

As the determined result, when the HDMI cable 300 is the low-resolution category 1, it is determined whether the output resolution clock that is currently set is greater than 74.25 MHz in order to compare the type of the HDMI cable 300 with the output resolution of the digital TV set 200 (S520).

This operation is to determine whether the HDMI cable 300 can support the output resolution which is currently set.

As the determined result, when the output resolution clock corresponding to the output resolution is greater than 74.25 MHz, it is determined that the HDMI cable 300 cannot support the output resolution which is currently set and a message that the HDMI cable 300 must be replaced or an abnormal screen may be outputted is displayed to the user (S530). At this time, the message can be displayed on the digital TV set 200 or the DVD player 100.

Accordingly, the user can replace the HDMI cable with a high-resolution HDMI cable or set the output resolution to a resolution which can be supported by the HDMI cable 300. The DVD player 100 can automatically determine whether the HDMI cable 300 can support the output resolution which is currently set and display the message to the user when the resolution cannot be supported, by only connecting the HDMI cable 300 to the DVD player 100 which is the source device, without allowing the user to directly determine whether the HDMI cable 300 is the low-resolution category 1 or the high-resolution category 2.

If the user selects a resolution higher than the resolution supported by the HDMI cable 300 when changing the resolution, an alert message is displayed to inform the user that a normal screen may not be outputted due to the limitation of the HDMI cable 300.

Although an example of connecting the DVD player 100 and the digital TV set 200 is described in the present embodiment, the present general inventive concept is not limited to this example. The same object and effect of the present general inventive concept may be accomplished even when a sync device such as a PDP, an LCD or a monitor is connected to a source device such as a STB.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to a signal output device of a HDMI device and a method thereof of the present embodiment, it is possible to automatically determine the type of an HDMI cable to connect a source device and a sync device and to inform a user of the type of the HDMI cable. In addition, it is possible to output a message that a HDMI cable must be replaced or an output resolution must be set to a resolution supported by the HDMI cable such that a display device such as a digital TV set can always display an optimal screen when the HDMI cable cannot support the current output resolution.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A signal output method of a digital interface device to output a signal of a device connected to a digital interface cable, the method comprising:

determining a type of the digital interface cable according to a voltage level of a reserved pin of a digital interface; and comparing a cable resolution which can be supported by the digital interface cable with an output resolution of the device which is set, and outputting whether the digital interface cable can support the output resolution, wherein the determining of the type of the digital interface cable comprises connecting a resistor to a reserved pin of the digital interface cable to determine the type of the digital interface cable, and the digital interface cable is a high definition multimedia interface (HDMI) cable, and the outputting of whether the digital interface cable can support the output resolution comprises outputting a message of whether the digital interface cable can support the output resolution when the HDMI cable cannot support the output resolution.

2. The method according to claim 1, wherein the determining of the type of the digital interface cable comprises checking whether a reserved pin of the HDMI cable is connected to ground or +5V to determine the type of the HDMI cable.

3. The method according to claim 2, wherein the reserved pin of the HDMI cable is a pin 14.

4. The method according to claim 1, wherein the message of whether the digital interface cable can support the output resolution comprises a message that the HDMI cable must be replaced when the HDMI cable cannot support the output resolution.

5. The method according to claim 1, wherein the message of whether the digital interface cable can support the output resolution comprises a message that the output resolution must be set to the cable resolution which can be supported by the HDMI cable when the HDMI cable cannot support the output resolution.

6. The method according to claim 1, further comprising:

selecting the output resolution of the device by a user command, wherein the message of whether the digital interface cable can support the output resolution comprises an alert message that the output resolution which cannot be supported by the HDMI cable is selected, when a user selects the output resolution which cannot be supported by the HDMI cable.

7. A signal output method of a digital interface device to output a signal of a device connected to a digital interface cable, the method comprising:

determining a type of the digital interface cable according to a voltage level of a reserved pin of a digital interface; and comparing the type of the digital interface cable with an output resolution of the device which is set, and outputting whether the type of the digital interface cable can support the output resolution, wherein the determining of the type of the digital interface cable comprises connecting a resistor to the reserved pin of the digital interface cable to determine the type of the digital interface cable, and the digital interface cable is a high definition multimedia interface (HDMI) cable, and the outputting of whether the digital interface cable can support the output resolution comprises outputting a message of whether the digital interface cable can support the output resolution when the HDMI cable cannot support the output resolution.

8. A signal output device of a digital interface device to output a signal of a device connected to a digital interface cable, the device comprising:

a controller which determines a type of the digital interface cable according to a voltage level of a reserved pin of a digital interface that is connected to a resistor and outputs whether the type of the digital interface cable can support an output resolution which is set, wherein the digital interface cable is a high definition multimedia interface (HDMI) cable, and the controller outputs a message of whether the digital interface cable can support the output resolution when the HDMI cable cannot support the output resolution.

9. The device according to claim 8, wherein the controller outputs a message that the digital interface cable must be replaced when the digital interface cable cannot support the output resolution.

10. The device according to claim 8, wherein the controller outputs a message that the output resolution is set so as to be supported by the digital interface cable when the digital interface cable cannot support the output resolution.

11. The device according to claim 8, wherein the controller outputs an alert message that the output resolution which cannot be supported by the digital interface cable is selected when a user selects the output resolution which cannot be supported by the digital interface cable.

12. A signal output device of a digital interface device comprising:

a transmission unit connectable to an external digital interface cable to receive information on a type of the external digital interface cable according to a voltage level of a reserved pin of a digital interface that is connected to a resistor; and a controller to generate a signal corresponding to the type of the external digital interface cable, wherein the signal includes at least one of a message representing the type of the external digital interface cable and a signal representing a difference between a predetermined resolution and a resolution corresponding to the type of the external digital interface cable, and the external digital interface cable is a high definition multimedia interface (HDMI) cable, the signal further comprises a message of whether the external digital interface cable can support the predetermined resolution when the HDMI cable cannot support the predetermined resolution.

13. The device of claim 12, wherein the controller generates the signal according to a communication state between the transmission unit and the external digital interface device.

14. The device of claim 12, wherein:

the transmission unit receives EDID from an external display device connectable through the external digital interface cable; and the controller generates the signal according to the received EDID signal.

15. The device of claim 14, further comprising:

a decoder to generate data signal to be displayed on the external display device, wherein the controller controls the decoder to generate the data signal having a resolution according to the EDID and the type of the external digital interface cable.

16. The device of claim 12, further comprising:

a decoder to decode a data stream to generate video data, wherein the controller controls the decoder to generate the video date to have a resolution according to the type of the external digital interface cable.

17. The device of claim 12, wherein the information comprises a connection state between pins of the digital interface device.

18. The device of claim 12, wherein the signal comprises at least one of a message to represent the type of the external digital interface cable and a signal to represent a difference between a predetermined resolution and a resolution corresponding to the type of the external digital interface cable.

* * * * *